(12) United States Patent
Duquesne et al.

(10) Patent No.: US 9,801,340 B2
(45) Date of Patent: Oct. 31, 2017

(54) SPREADER ARRANGEMENT FOR AN AGRICULTURAL HARVESTER

(71) Applicant: CNH Industrial America LLC, New Holland, PA (US)

(72) Inventors: Frank R. G. Duquesne, Zwevegem (BE); Jonathan E. Ricketts, Coal Valley, IL (US); Herbert M. Farley, Elizabethtown, PA (US); Stefaan Desmet, Vosselare (BE); Frederik Baes, Reninge (BE); Mark D. Dilts, New Holland, PA (US); Nathan E. Isaac, Lancaster, PA (US); Craig E. Murray, Davenport, IA (US); Justin L. Montenguise, Bettendorf, IA (US); Stefaan Ballegeer, Beernem (BE); Nicholas S. Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/701,465

(22) Filed: Apr. 30, 2015

(65) Prior Publication Data

US 2016/0316622 A1    Nov. 3, 2016

(51) Int. Cl.
*A01F 12/30* (2006.01)
*A01D 41/12* (2006.01)

(52) U.S. Cl.
CPC ................. *A01D 41/1243* (2013.01)

(58) Field of Classification Search
CPC ............................................. A01D 41/1243
USPC .................. 460/111, 112, 113, 901
See application file for complete search history.

(56) References Cited

U.S. PATENT DOCUMENTS

| 2,626,159 | A | * | 1/1953 | Thompson | A01F 12/40 239/689 |
| 3,149,449 | A | * | 9/1964 | Mulder | A01D 41/1243 56/192 |
| 4,056,107 | A | * | 11/1977 | Todd | A01F 12/40 241/186.3 |
| 4,532,941 | A | | 8/1985 | Gauthier | |
| 4,617,942 | A | * | 10/1986 | Garner | A01F 12/40 460/112 |
| 4,669,489 | A | * | 6/1987 | Schraeder | A01F 12/40 241/186.3 |

(Continued)

FOREIGN PATENT DOCUMENTS

| EP | 0357090 A2 | 3/1990 |
| EP | 2848112 A1 | 3/2015 |

(Continued)

*Primary Examiner* — Thomas B Will
*Assistant Examiner* — Joan D Misa
(74) *Attorney, Agent, or Firm* — Patrick M. Sheldrake

(57) ABSTRACT

A spreader arrangement for an agricultural harvester includes a pair of spreader discs, at least one cover plate and a windrow chute. The spreader discs are generally horizontally arranged and rotatable in a counter rotating manner. Each cover plate is positioned at a location above a respective spreader disc, and is operable to inhibit a flow of crop material to the respective spreader disc when positioned above the respective spreader disc. The windrow chute has an entrance end positioned below the pair of cover plates and above the pair of spreader discs, whereby crop material is discharged from the top of the cover plates into the windrow chute.

6 Claims, 2 Drawing Sheets

(56) References Cited

U.S. PATENT DOCUMENTS

| | | | |
|---|---|---|---|
| 4,858,419 A | 8/1989 | Bernier | |
| 5,976,011 A * | 11/1999 | Hartman | A01D 41/1243 460/111 |
| 6,251,009 B1 | 6/2001 | Grywacheski et al. | |
| 6,343,986 B1 * | 2/2002 | Hofer | A01D 41/1243 460/111 |
| 6,547,169 B1 * | 4/2003 | Matousek | A01F 12/40 239/149 |
| 6,554,701 B1 * | 4/2003 | Wolters | A01D 41/1276 460/101 |
| 6,582,298 B2 * | 6/2003 | Wolters | A01D 41/1243 460/103 |
| 6,656,038 B1 * | 12/2003 | Persson | A01F 12/40 460/112 |
| 6,863,605 B2 * | 3/2005 | Gryspeerdt | A01F 12/40 460/111 |
| 6,881,145 B2 * | 4/2005 | Holmen | A01D 41/1243 460/112 |
| 6,908,379 B2 * | 6/2005 | Gryspeerdt | A01F 12/40 460/111 |
| 6,939,221 B1 * | 9/2005 | Redekop | A01D 41/1243 460/111 |
| 7,044,853 B2 * | 5/2006 | Weichholdt | A01F 12/40 460/112 |
| 7,220,179 B2 | 5/2007 | Redekop et al. | |
| 7,455,584 B2 * | 11/2008 | Farley | A01D 41/1243 460/111 |
| 7,473,171 B1 * | 1/2009 | Schwinn | A01D 41/1243 460/111 |
| 7,559,833 B2 * | 7/2009 | Isaac | A01D 41/1243 460/111 |
| 7,648,413 B2 * | 1/2010 | Duquesne | A01D 41/127 460/112 |
| 7,744,450 B2 * | 6/2010 | Hoskinson | A01F 12/44 460/111 |
| 7,927,200 B2 * | 4/2011 | Van Overschelde | A01F 12/40 460/112 |
| 8,070,570 B2 * | 12/2011 | Murray | A01F 29/12 239/681 |
| 8,079,900 B2 * | 12/2011 | Klein | A01D 41/1243 460/111 |
| 8,152,609 B2 * | 4/2012 | Benes | A01D 41/1243 460/111 |
| 8,585,475 B2 * | 11/2013 | Isaac | A01F 12/40 460/111 |
| 8,834,243 B2 | 9/2014 | Benes et al. | |
| 9,107,349 B2 * | 8/2015 | Dilts | A01F 12/40 |
| 9,370,141 B2 * | 6/2016 | Isaac | A01F 12/30 |
| 2003/0114207 A1 * | 6/2003 | Wolters | A01F 12/40 460/111 |
| 2004/0029624 A1 * | 2/2004 | Weichholdt | A01F 12/40 460/112 |
| 2004/0092298 A1 * | 5/2004 | Holmen | A01D 41/1243 460/111 |
| 2005/0101363 A1 * | 5/2005 | Farley | A01D 41/1243 460/112 |
| 2006/0073860 A1 * | 4/2006 | Redekop | A01F 12/40 460/112 |
| 2009/0111548 A1 * | 4/2009 | Landuyt | A01D 41/1243 460/112 |
| 2014/0066146 A1 | 3/2014 | Dilts et al. | |
| 2014/0066147 A1 | 3/2014 | Dilts et al. | |
| 2015/0011276 A1 | 1/2015 | Murray et al. | |

FOREIGN PATENT DOCUMENTS

| | | | | |
|---|---|---|---|---|
| SE | WO 9205687 A1 * | 4/1992 | | A01D 41/1243 |
| WO | WO 2013148647 A1 * | 10/2013 | | A01D 41/1243 |

* cited by examiner

SPREADER ARRANGEMENT FOR AN AGRICULTURAL HARVESTER

BACKGROUND OF THE INVENTION

1. Field of the Invention

The invention relates generally to agricultural equipment, such as harvesters, and more specifically, to spreader arrangements on such harvesters for spreading agricultural material to a field.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge straw, chaff and other debris toward the rear of the combine.

During the process of harvesting, crop material other than grain (MOG) is intended to be expelled from the combine. This material is usually derived from one of two areas, the threshing rotor or the cleaning system. The material expelled from the threshing rotor is generally referred to as straw and the material expelled from the cleaning system is generally referred to as chaff. This material or crop residue is typically dealt with by spreading or windrowing.

Spreading is accomplished using a mechanical device termed a spreader to distribute the straw and/or chaff substantially evenly from the rear of the combine. This spread material is usually chopped to as short a length as possible so that when it is spread it will break down as quickly as possible and not interfere with tillage or seeding operations.

Windrowing refers to the process of dropping straw directly behind the combine in a continuous stream. The purpose of doing this is usually to allow post harvest processing of the straw such as shaping it into bales. In this process, the straw is usually allowed to pass through the combine with as little interference as possible so that it remains as close as possible to its original length and condition.

U.S. Patent Application Publication No. 2015/0011276A1 (which is assigned to the assignee of the present invention) discloses a spreader arrangement which simply and effectively allows both spreading and windrowing from the rear of the harvester. A selectively movable swath door at the upper rear of the straw hood is movable between a first position directing crop material to the spreader discs, and a second position directing crop material to a windrow chute. The windrow chute folds up and out of the way to the rear of the straw hood when the spreader arrangement is in the spreading mode.

What is needed in the art is a spreader arrangement which can be easily reconfigured between the spreading and windrowing modes.

SUMMARY OF THE INVENTION

The present invention provides a spreader arrangement with a pair of cover plates which are positioned above the spreader discs, and a windrow chute positioned below the cover plates, when the spreader arrangement is in a windrowing mode.

In one embodiment, a spreader arrangement for an agricultural harvester includes a pair of spreader discs, at least one cover plate and a windrow chute. The spreader discs are generally horizontally arranged and rotatable in a counter rotating manner. Each cover plate is positioned at a location above a respective spreader disc, and is operable to inhibit a flow of crop material to the respective spreader disc when positioned above the respective spreader disc. The windrow chute has an entrance end positioned below the pair of cover plates and above the pair of spreader discs, whereby crop material is discharged from the top of the cover plates into the windrow chute.

An advantage of the present invention is that the spreader arrangement can be easily configured for the windrowing mode such that the cover plates are positioned above the spreader discs, the windrow chute is positioned below the cover plates, and the adjustable door directs crop material toward the windrow chute.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
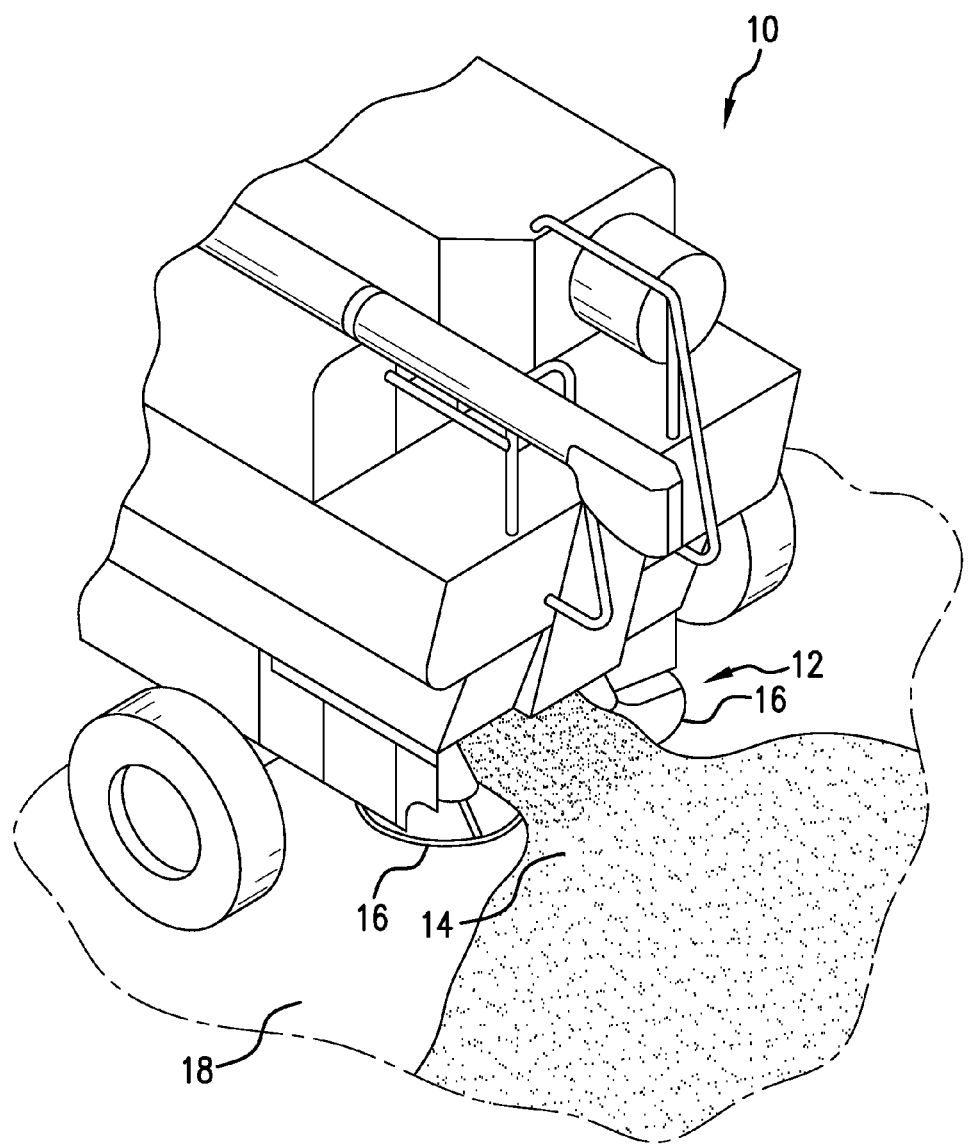
FIG. 1 is a rear perspective view of an embodiment of an agricultural harvester including an embodiment of a spreader arrangement of the present invention, with the spreader arrangement in a spreading mode.

Referring now to the drawings, FIG. 1 is a rear perspective view of an embodiment of a combine harvester 10 with a spreader arrangement 12. The harvester 10 may harvest grains such as barley, corn, flax, oats, rye, soybeans, wheat, and so forth. Accordingly, the harvester 10 is configured to remove the desired portion of the plant and to separate the portion into different agricultural materials (e.g., grain, straw, and chaff). As discussed above, the harvester discharges this material after processing it. Some of the agricultural materials may be discharged from the rear of the harvester 10 using the spreader arrangement 12. For example, as shown in FIG. 1, the spreader arrangement 12 may direct crop residue 14 including straw and chaff into the spreader discs 16 to distribute the straw and chaff evenly over a field 18. Alternatively, as discussed in more detail below with reference to FIG. 2, the spreader arrangement 12 may distribute the straw and chaff in windrows behind the combine harvester 10.

Figure 2:
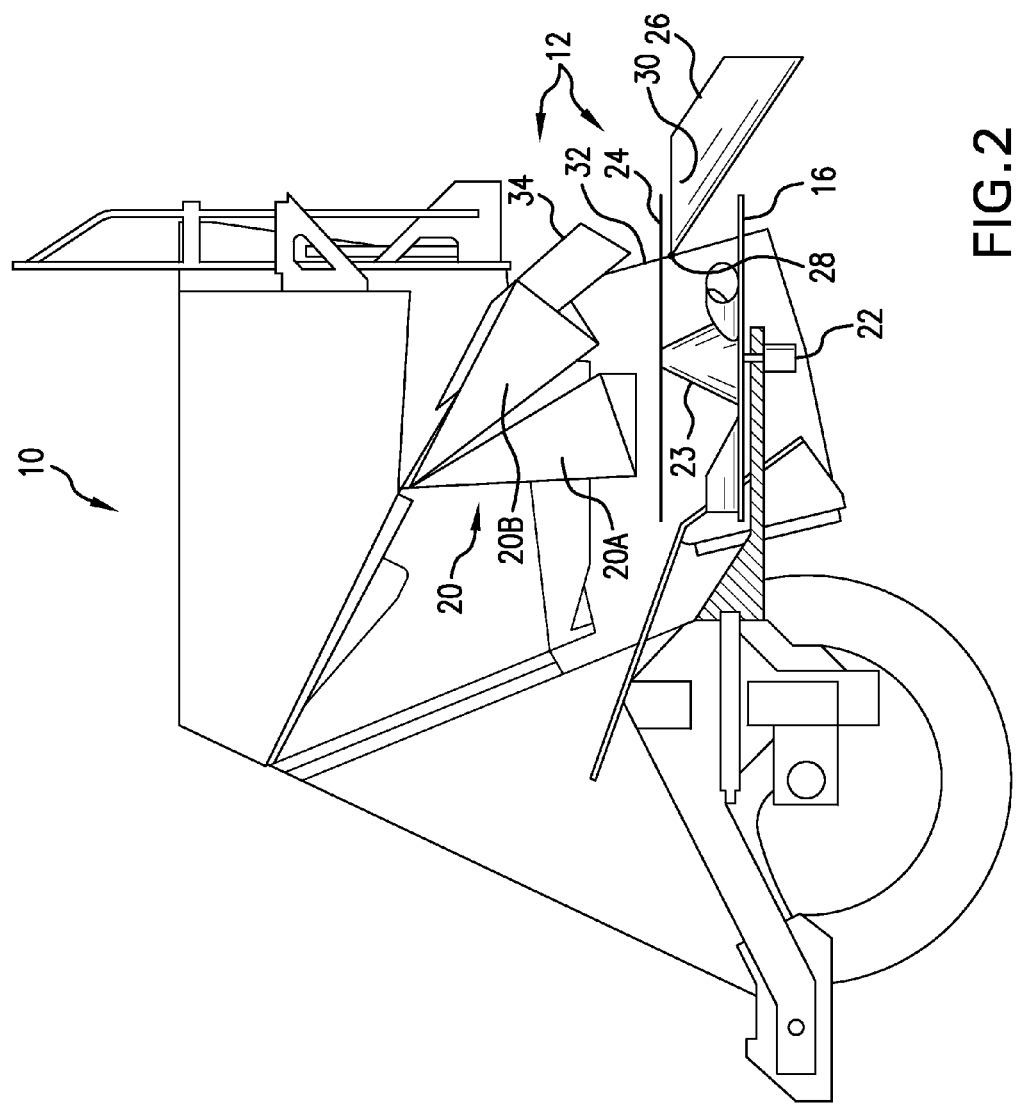
FIG. 2 is a side schematic view of the harvester shown in FIG. 1, with the spreader arrangement in a windrow mode.

Referring now to FIG. 2, there is shown a side schematic view of the spreader arrangement 12 shown in FIG. 1, with the spreader arrangement 12 being configured in a windrowing mode. The spreader arrangement 12 generally includes an adjustable door 20 which is positioned above the pair of spreader discs 16. The spreader discs 16 are generally horizontally arranged relative to each other and rotatable in a counter rotating manner. A pair of drive motors 22 are positioned below and rotatably drive each respective spreader disc 16. The drive motors 22 are configured as hydraulic motors in the illustrated embodiment, but could also be electric or pneumatic motors.

The spreader arrangement 12 can also include a pair of cones 23, with each cone 23 being generally concentrically positioned above a respective spreader disc 16. The cones 23 function to direct the crop residue in a radially outward direction toward the blades (not numbered) carried by each spreader disc 16.

The spreader arrangement 12 also includes a pair of cover plates 24 and a windrow chute 26. These components are only used when the spreader arrangement 12 is in the windrowing mode as shown in FIG. 2. To that end, the pair of cover plates 24 and the windrow chute 26 may be removably attached to suitable structure at the rear of the combine 10 (e.g., frame members, etc). Alternatively, the windrow chute 26 can be pivotally attached to suitable structure on the combine 10, as indicated by the hinge 28.

Each cover plate 24 is positioned at a location generally concentrically above and adjacent a respective cone 23 and spreader disc 16. Each cover plate 24 is operable to inhibit a flow of crop material to the respective spreader disc 16 when positioned above the respective spreader disc 16.

In the illustrated embodiment, the spreader arrangement 12 includes a pair of cover plates 24 configured as flat discs which are positioned above each respective spreader disc 16. However, the cover plates 24 can have a different shape and/or height. For example, the cover plates 24 could have a slightly cone shaped configuration, or have a flat octagon shaped configuration. Moreover, the pair of cover plates 24 can overlap each other at different elevations above the spreader discs 16, which would tend to reduce the amount of dead space above the windrow chute 26. Further, the spreader arrangement 12 can also include a single cover plate extending across both spreader discs 16 rather than a pair of cover plates above each spreader disc 16. Additionally, the cover plates 24 need not necessarily be oriented horizontally, but can also be oriented at a slope of between approximately +/−30° (in any direction). Other variations are also possible.

The windrow chute 26 acts as a chute or trough to direct the crop material toward the windrow formed behind the harvester 10 when the spreader arrangement 12 is in the windrowing mode. The windrow chute 26 has an entrance end 30 positioned below the pair of cover plates 24 and above the pair of spreader discs 16, whereby crop material is discharged from the top of the cover plates 24 into the windrow chute 26. The windrow chute 26 can be removably mounted to the rear of the straw hood 32, and simply removed to reconfigure the spreader arrangement 12 for the spreader mode. Alternatively, the windrow chute 26 can be movable to the position below the pair of cover plates 24 when the spreader arrangement 12 is in a windrow mode, and movable to a position away from the spreader discs 16 when the spreader arrangement 12 is in a spreading mode. In the illustrated embodiment, the windrow chute 26 is pivotally movable about the hinge 28 to a position above the spreader discs 16 when the spreader arrangement 12 is in the spreading mode.

Optional guide panels 34 extend from the adjustable door 20 toward the windrow chute 26. The guide panels 34 assist with directing the crop residue into the windrow chute 26 when the spreader arrangement 12 is in the windrow mode.

During operation of the harvester 10, the spreader arrangement 12 can be configured for the spreading mode by simply removing the cover plates 24 and pivoting the windrow chute 26 up and out of the way about the hinge 28. The adjustable door 20 is moved to the forward or down position shown at reference number 20A, which then directs the crop residue in a downward direction toward the spreader discs 16.

The spreader arrangement 12 can be configured for the windrowing mode by pivoting the windrow chute 26 downward about the hinge 28, and installing the cover plates 24 above the spreader discs 16. The adjustable door 20 is moved to the rearward or up position shown at reference number 20B, which then directs the crop residue in a rearward direction toward the windrow chute 26. The cover plates 24 can still rotate with the spreader discs 16, so any crop residue that lands on top of the cover plates 24 is deposited into the windrow chute 26. Alternatively, the drive motor 22 for each spreader disc 16 can be turned OFF.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A spreader arrangement for an agricultural harvester, comprising:
    a pair of spreader discs which are generally horizontally arranged and rotatable in a counter rotating manner;
    at least one cover plate, said at least one cover plate being operable to inhibit a flow of crop material to a respective said spreader disc when positioned above the respective spreader disc, wherein each said at least one cover plate is removably attached above and adjacent a respective said spreader disc; and
    a windrow chute having an entrance end positioned below the said at least one cover plate and above the pair of spreader discs, whereby crop material is discharged from the top of the said at least one cover plate into the windrow chute.

2. The spreader arrangement of claim 1, wherein the windrow chute is movable to the position below said at least one cover plate when the spreader arrangement is in a windrow mode, and movable to a position away from the spreader discs when the spreader arrangement is in a spreading mode and said at least one cover plate is removed from above the respective spreader disc.

3. The spreader arrangement of claim 2, wherein the windrow chute is movable to a position above the spreader discs when the spreader arrangement is in the spreading mode.

4. The spreader arrangement of claim 1, wherein the spreader arrangement includes a pair of cones, each said cone being generally concentrically positioned above a respective said spreader disc, and each said cover plate being generally concentrically positioned above each respective said cone.

5. The spreader arrangement of claim 1, further including an adjustable door positioned above the said at least one cover plate, the adjustable door being movable between a first position directing crop material toward the spreader discs, and a second position directing crop material toward the windrow chute.

6. The spreader arrangement of claim 1, wherein the at least one cover plate includes a pair of flat discs, each said flat disc being positioned at a location above a respective said spreader disc.

\* \* \* \* \*